Patented Feb. 12, 1929.

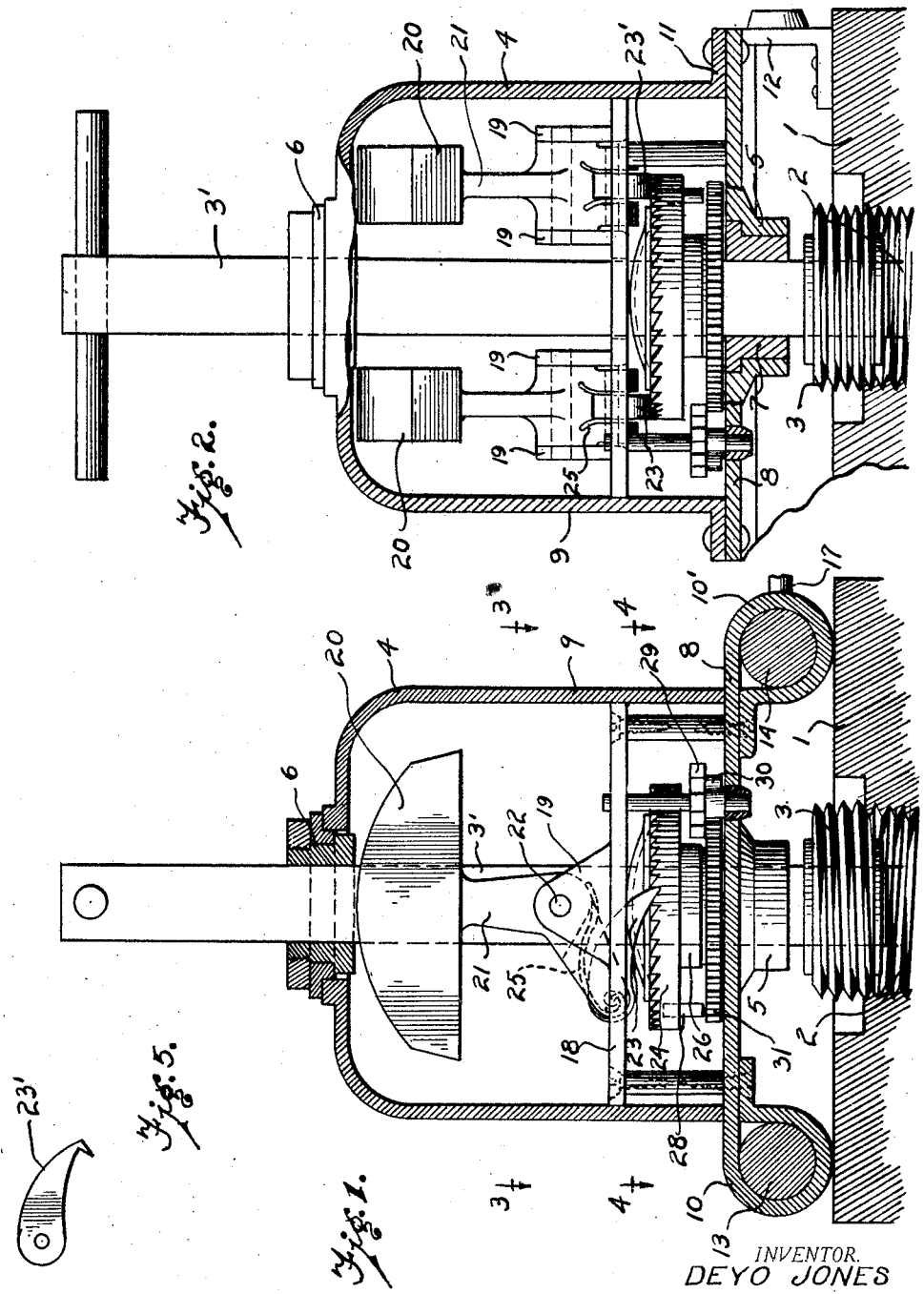

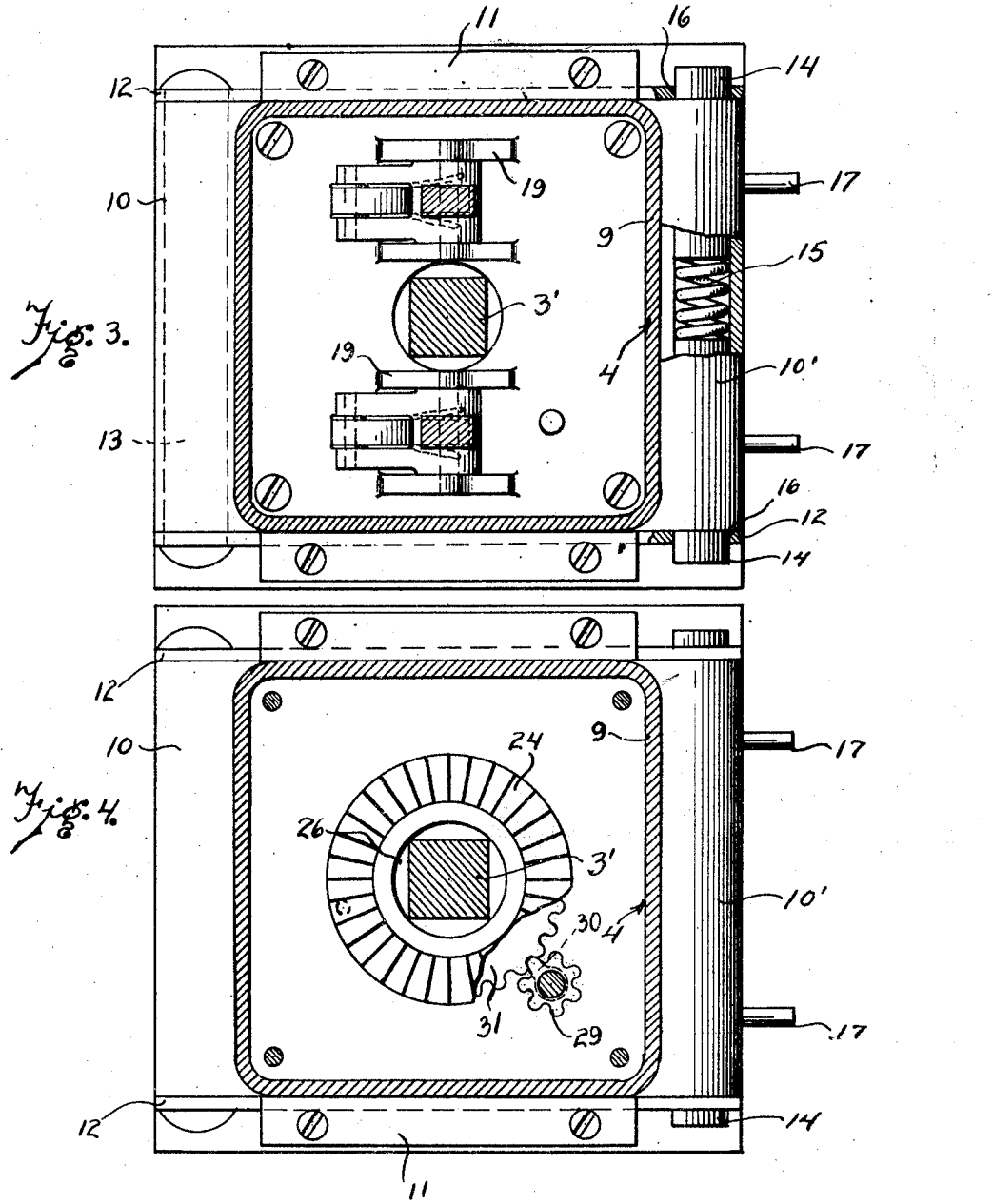

1,701,618

UNITED STATES PATENT OFFICE.

DEYO JONES, OF DETROIT, MICHIGAN, ASSIGNOR TO GENERAL SALES COMPANY, OF DETROIT, MICHIGAN, A CORPORATION OF MICHIGAN.

LOCOMOTIVE ROD-PIN LUBRICATOR.

Application filed March 12, 1927. Serial No. 174,829.

This invention relates to lubricating devices for locomotive rod pin connections and an object thereof is to provide an automatic device for feeding grease to the crank pin connection of locomotive drive wheels.

Another object is to provide a self feeding lubricating device actuated by the movement of the locomotive rod to continuously feed grease to the rod pin connection during the operation thereof.

Another object of this device is to provide a lubricating device of the character stated that will automatically feed grease to the crank pin connection in amounts directly proportional to the speed of the locomotive rod.

A further object of this invention is to provide a grease cup having a plunger adapted to be automatically screwed into the cup to feed grease by operation of swinging pendulums actuated by the throw of the rod to which the device is attached.

With these and other objects in view, my invention consists of the principal features as shown in the drawings, described in the specification and claimed in the claims.

In the drawings:

Fig. 1 is a vertical section through the device.

Fig. 2 is a similar view at right angles thereto.

Fig. 3 is a section on line 3—3 of Fig. 1.

Fig. 4 is a section on line 4—4 of Fig. 1.

Fig. 5 is a detail of one of the actuating dogs.

This invention differs from the patent on lubricating device for locomotive rod pin construction, Patent No. 1,310,531 issued to Deyo Jones, July 22, 1919 in the fact that swinging pendulums are used to actuate the grease feed plunger instead of a sliding block as shown in the aforementioned patent. The advantage of using pendulums instead of a sliding block is due to the fact that a very slow motion of the locomotive rod will still allow the pendulums to swing in the plane of movement of the locomotive rod and thus turn the plunger to feed the grease to the crank pin bearings.

Referring now to the drawings wherein similar characters refer to similar parts throughout the several views, 1 designates the upper portion of the locomotive rod having therein a grease cup 2. This construction and also the connection to the crank pin is shown in said Patent No. 1,310,531. Threaded in the grease cup 2 is the plunger 3, said plunger being provided with a stem 3'. The stem 3' is preferably square in cross section as shown in Figs. 3 and 4 and extends through a box 4. A lower bearing 5 and an upper bearing 6 in the box 4 tend to keep the stem 3' in a vertical position while still allowing free rotation thereof. The lower bearing 5 in the box 4 consists of a bushing 7, shown in Fig. 4, provided with a square hole, said square hole being slightly larger than the stem 3' thus allowing free vertical movement of the said stem when the plunger 3 is being screwed down into the grease cup 2. The outer portion of the bushing 7 is circular in cross section and is rotatably mounted in the lower flange 8 of the box 4. The upper bearing 6 is similar in construction to the lower bearing 5.

The box 4 is preferably made in two pieces comprising the upper portion 9 and the lower flange 8. The lower flange 8 is provided on two of its sides with the tubular portions 10 and 10' and on its other two sides it is riveted or otherwise secured to the flanged portions 11 of the upper portion 9. A pair of angle irons 12 are secured to the upper face of the locomotive rod 1. A hinge pin 13 extends through the angle irons 12 and through the tubular portion 10 and permits the box 4 to be swung around to such a position as will allow the grease cup 2 to be readily filled as will be readily understood from Fig. 3. The tubular portion 10' has inserted therein a pair of locking pins 14, said pins being forced outwardly by a spring 15 and into engagement with a set of holes 16 in the angle irons 12 shown in Fig. 3. A pair of finger grips 17 on the locking pins 14 permit said pins 14 to be retracted from engagement with the holes 16 when it is desired to swing the box 4 to a position to permit filling of the grease cup 2. The box 4 is also provided between its top and bottom with a partition 18 shown in Figs. 1, 2 and 3. Pivotally mounted between the ears 19 on the plate 18 are a pair of pendulums or swinging weights 20. As will be best seen from Fig. 1 the pendulums 20 are carried by the bell crank arms 21. The arms 21 are pivoted at 22 to the upstanding ears 19 on the plate 18. Pivoted to the arms 21 at the opposite ends from the weights 20 are the spring pressed dogs 23 and 23′. It will be noted from Figs. 1 and 5 that the dogs 23 and 23′ are slightly different as it is desirable to operate the grease feeding mechanism by movement in one direction of either pendulum. As shown from Fig. 1 a movement of the pendulum 20 from right to left will cause the dog 23 to engage the ratchet 24 and rotate said ratchet a predetermined number of teeth. The dog 23′ being mounted for engagement with the ratchet 24 upon the opposite side of the ratchet 24 from that of the dog 23 the dog 23′ will ride over the teeth of the ratchet 24 when the pendulums are swung from right to left, but when the reverse motion takes place and the pendulums are swung from left to right the dog 23 will ride over the ratchet 24. Springs 25 are provided to keep the dogs 23 and 23′ in engagement with the teeth of the ratchet 24. It will be noted from Figs. 1, 2 and 4 that the ratchet wheel 24 is provided with a bushing 26 having a square hole therein of approximately the same size as the stem 3′ the said bushing 26 being substantially circular in cross section and fitting in a round hole in the ratchet 24 so that rotation of the ratchet 24 will not cause rotation of the stem 3′. The ratchet 24 as shown in Figs. 1 and 4 is also provided with a depending pin 28, said pin being positioned to engage the pinion 29 and index it one tooth in every revolution of the ratchet wheel 24. Positioned beneath the pinion 29 and integral with it is a single tooth member 30. This tooth 30 is so arranged that once in every revolution of the pinion 29 it will engage between the teeth of the gear 31 and rotate said gear 31 the distance of one tooth.

The operation of my device is as follows:

The grease cup 2 is first filled and the box 4 is set in position and locked by the pins 14. The plunger 3 is then threaded into the cup 2 and the device is then ready for the automatic feeding of the grease. The pendulums being arranged so that their throw is in the same plane as the reciprocation of the locomotive rod, every reciprocating movement of the rod will cause a corresponding movement of the pendulums 20 and through the arms 21 a corresponding movement will be imparted to the dogs 23 and 23′ one of the dogs engaging the ratchet 24 at this time and the other being free to slide over the teeth. Upon the return movement of the locomotive rod 1 the opposite action will take place. The dog that was out of engagement will now be in engagement with the teeth of the ratchet 24 while the other dog will be free to slide over the teeth of the ratchet 24 and thus the movement of the dogs 23 and 23′ will impart a rotary movement to the ratchet 24.

The ratchet wheel 24 being provided with a pin 28, one complete revolution of the ratchet wheel will be necessary to move the pinion 29 the distance of one tooth. After the pinion 29 has completed one complete revolution the single tooth 30 on the lower face of the pinion 29 will engage between the teeth of the gear 31 and thereby rotate it the distance of one tooth. The gear 31 having a square hole therein to fit the stem 3′ a consequent rotation will be imparted to the threaded plunger 3 thereby screwing it down a certain distance and forcing a certain amount of grease to the crank pin connection.

From the foregoing description it will be seen that the device is comparatively simple in form, is entirely automatic in operation, will feed the grease to the bearings in direct proportion to the speed of the locomotive rod, and will operate at all times no matter what the speed of the locomotive may be.

Having thus fully described my invention, its utility and mode of operation, what I claim and desire to secure by Letters Patent of the United States is—

1. A lubricating device for locomotive rod pins comprising the combination with the rod and pin, of an internally threaded cup for grease provided in the rod, a plunger having a stem and being in threaded relation with the cup, a casing supported on the rod above the cup and through which the plunger stem extends, the casing having an upper and a lower chamber, a pendulum in the upper chamber caused to oscillate by movement of the rod, said pendulum having a pawl at its lower end extending into the lower chamber the wall between the chambers having an aperture within which the pawl is movable, a ratchet rotatably mounted in the lower chamber on the axis of the stem, a pinion in the lower chamber rotatable on a fixed axis at one side of the stem axis, means on the ratchet adapted to engage the pinion and turn the same one tooth once every revolution of the ratchet, a gear supported in the lower chamber on the axis of the stem through rotation of which the stem is rotated and the plunger threaded in the cup, and a single tooth gear on the axis of the said pinion and rotatable in fixed relation thereby, the single tooth gear engaging the aforesaid gear and causing the same to turn one tooth at a time for each revolution of the said pinion.

2. A lubricating device for locomotive rod pins comprising the combination with the rod and pin, of an internally threaded cup for grease provided in the rod, a plunger having a stem and being in threaded relation with the cup, a casing hingedly supported on the rod above the cup and through which the plunger stem extends, a pair of pendulums pivotally supported in the casing on diammetrically opposite sides of the plunger, a ratchet rotatably supported on the plunger axis and through which the plunger is movable, each of said pendulums having a pawl engaging the ratchet, the said pawls being so formed and positioned that movement of one of the pawls through the swinging of its pendulum in one direction turns the rachet and movement of the other pawl through movement of its pendulum in the opposite direction turns the ratchet in the same direction, a gear train actuated through rotation of the ratchet, said gear train including a member through rotation of which the plunger is rotated and caused to feed into the cup.

3. In a lubricating device for locomotive rod pins, the combination therewith of an internally threaded cup for grease, a plunger having a stem and being in threaded relation with the cup, a casing supported on the rod through which the plunger stem extends, a pair of pendulums pivotally mounted in the casing and arranged to be oscillated on their pivots through movement of the rod, a rotatable member, means whereby the swinging of each of the pendulums causes rotation of the said member, said means being actuated through movement of one of the pendulums in one direction and through movement of the other pendulum in an opposite direction, and means actuated through rotation of the said rotatable member to rotate the plunger.

In testimony whereof, I sign this specification.

DEYO JONES.